June 19, 1962 J. DOBBIE 3,040,187

DIFFERENTIAL RATE CIRCUIT

Filed Oct. 20, 1960

WITNESSES:

Leon M. Garman

Lawrence I. Lerner

INVENTOR

James Dobbie

BY

Paul E. Friedemann

ATTORNEY

United States Patent Office 3,040,187

Patented June 19, 1962

3,040,187

DIFFERENTIAL RATE CIRCUIT

James Dobbie, Williamsville, N.Y., assignor to Westinghouse Electric Corporation, East Pittsburgh, Pa., a corporation of Pennsylvania Filed Oct. 20, 1960, Ser. No. 63,844

4 Claims. (Cl. 307—88.5)

This invention relates to circuits which furnish an output signal on either of two output lines, which output signal is equal to the difference in pulse rates between two corresponding lines of input signal pulses. When the input on a first input line is higher, its corresponding output line should contain this difference while the output of the other output line should be zero and vice versa. More particularly, this invention relates to differential rate circuits using static logic elements.

Therefore, it is a general object of this invention to provide an improved differential rate circuit.

It is another object of this invention to provide an improved differential rate circuit utilizing static logic components shown in a preferred embodiment as transistorized logic components.

It is another object of this invention to provide an improved differential rate circuit which furnishes an output signal on either of two lines, which output signal is equal to the difference in pulse rates received between two corresponding input lines of input signal pulses.

It is another object of this invention to provide an improved and more simple differential rate circuit utilizing a minimum number of static logic components.

Further objects of this invention will become apparent from the following description when taken in conjunction with the accompanying drawing. In said drawing, for illustrative purposes only, there is shown a preferred embodiment of this invention.

Figure 1:
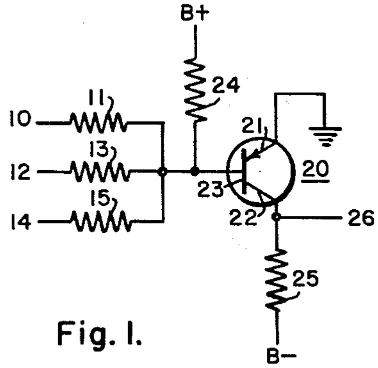
FIGURE 1 is a schematic diagram of a prior art NOR circuit which may be utilized to perform a NOR logic function used in this invention.

Referring to FIG. 1, the schematic diagram illustrates the use of a transistor 20 to perform a logical function commonly known to those skilled in the present art as the NOR logic function. A NOR logic function is performed by a circuit apparatus which provides an output voltage signal only if there is neither an input signal 10 nor an input signal 12 nor an input signal 14. If the logic function is performed in a binary system then the NOR logic circuit has an output of one only if there is neither an input 10 nor an input 12 nor an input 14. If any of the plurality of inputs to the NOR logic circuit is one, then the output of the logic circuit is zero.

The transistor 20 of FIG. 1 comprises a semi-conductive body having an emitter electrode 21, a collector electrode 22 and a base electrode 23. The emitter electrode 21 is connected to ground. The base electrode 23 is connected to a plurality of input terminals 10, 12 and 14 through the respective isolating impedances 11, 13 and 15. The base electrode 23 is also connected through a resistor 24 to a B+ bias supply. The collector electrode 22 is connected through a current limiting resistor 25 to a B— voltage supply source. The collector 22 is also connected to an output terminal 26.

In operation, the B+ bias supply biases the transistor 22 to cut off through the resistor 24. Thus, when there are no input signals to terminals 10, 12 and 14, the transistor 20 is cut off and an output signal (hereinafter termed a "one") will appear at the terminal 26 which will be approximately the value of the B— supply. If a negative input pulse sufficient in magnitude to drive the transistor 20 to a fully saturated condition is applied to one or more of the base terminals 10, 12 or 14, the transistor 20 will conduct and there will be no output signal (or a "zero") at the terminal 26, since the output terminal 26 is now effectively at ground potential. Therefore, it may be seen that the apparatus illustrated in FIG. 1 performs the NOR logic function as hereinbefore described. That is, when a negative input pulse is present at any one of the input terminals 10, 12 and 14, the output at the terminal 26 will be zero. If no input signals are present at the terminals 10, 12 or 14, the output at the terminal 26 will be one, as represented by the potential of the B— supply source. Although the apparatus of FIG. 1 is shown as using a p-n-p type of transistor, an n-p-n type of transistor may be utilized if the polarities of the bias supply voltage and the input signals are reversed, as readily evident to persons skilled in this art.

Figure 2:
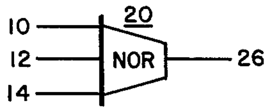
FIG. 2 is a symbolic representation of a prior art NOR logic element performing the function of FIG. 1; and, FIG. 3 is a schematic diagram of a differential rate circuit embodying the teachings of the present invention.

Referring to FIG. 2, there is shown the well known symbol representing a circuit which performs a NOR logic function and which may be utilized in the illustrations of systems utilizing NOR logic components for the purpose of simplicity and clarity. The symbol shown in FIG. 2 has been extensively utilized in the prior art literature in connection with the NOR logic function.

Figure 3:
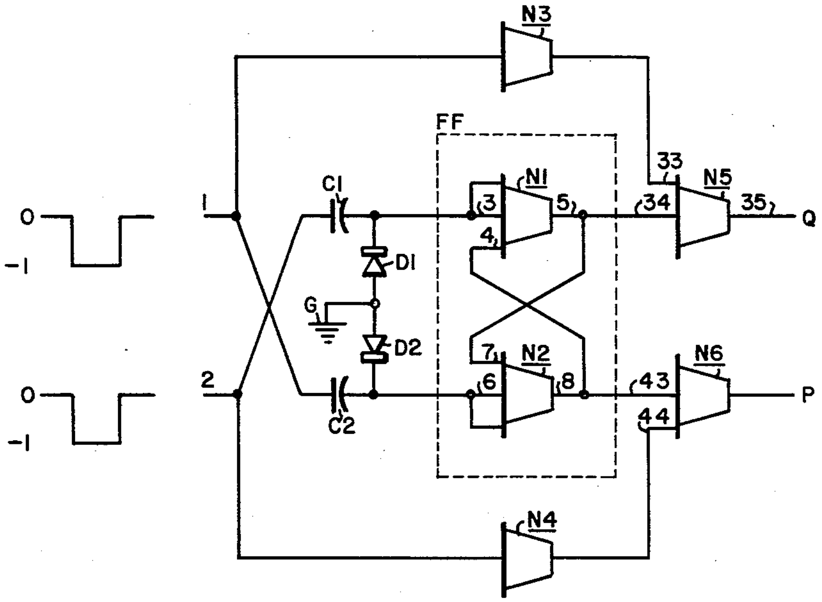

Referring to FIG. 3, there is a block diagram of a differential rate circuit embodying the teachings of the present invention. Two pulse trains are applied respectively to input 1 and input 2. The output signals from the circuit will come from either output Q or output P. If the frequecy F1 of the input signal pulses on input 1 is greater than the frequency F2 of the input signal pulses on input 2, then the output signal of the circuit will appear on output Q and this will be in the form of a pulse train at the difference frequency i.e. $(F1-F2)$. If F2 is greater than F1 then the output will appear at output P, said output being a pulse train with the difference frequency of $(F2-F1)$. If the two frequenceis F1 and F2 on the inputs 1 and 2 respectively are equal, then the pulse outputs Q and P will each be zero. Such a device for detecting the difference in pulse rates between two lines of input pulses is useful in many fields of application, for example, motor speed regulators and synchronizing position controls.

The embodiment of the invention shown in FIG. 3 comprises input lines 1 and 2 and a flip-flop circuit FF. The flip-flop FF is comprised of NOR elements N1 and N2, where the output 5 of NOR element N1 is connected to an input 7 of the NOR element N2. The output 8 of NOR element N2 is connected to the input 4 of NOR element N1. A capacitor C1 connects the input signal line 2 to the input terminal 3 of NOR N1, and a capacitor C2 connects the input signal line 1 to the NOR N2 input terminal 6. A diode D2 is connected between the input terminal 6 and ground G, and a diode D1 is connected between the input terminal 3 and ground G. A third NOR element N3 is connected between the input signal line 1 and an input 33 of a fifth NOR element N5. A fourth NOR element N4 is connected between the input signal line 2 and an input 44 of a sixth NOR element N6. The fifth NOR element N5 has one of its inputs 34 connected to the output 5 of NOR element N1. The output 35 of NOR element N5 is connected to the output terminal Q. The sixth NOR element N6 has one of its inputs 43 connected to the output 8 of NOR element N2. The output 45 of NOR element N6 is connected to the output terminal P.

The operation of the device is as follows. In the initial condition with no input signals applied on input lines 1 and 2, the output of NOR element N1 is one. This holds NOR element N2 so that there is a zero output at the output terminal 8. Since there is a zero output at the terminal 8, there are no one inputs to the NOR element N1 and it remains cut off to provide its one value output signal. The NOR elements N3 and N4 having only zero inputs have an output of one at their respective outputs. Thus, they hold NOR elements N5 and N6 so that there is a zero value signal on each of the output terminals Q and P. When a first signal arrives at input line 1 it immediately applies a one signal to the input of NOR element N3 bringing its output to zero and the input to NOR element N5 at input terminal 33 to zero. The negative going portion of this same input pulse is delayed by the capacitor C2. The current which flows through the capacitor C2 does not reach the NOR element N2 but is shunted to ground by the diode D2. The diode D2 is placed in the circuit to shunt any negative current applied to the base 6 of the NOR element N2.

However, when the trailing edge of the said pulse applied to input line 1 arrives, it applies a positive current flow through the capacitor C2. This positive current flow is not shunted by diode D2 and acts to buck the negative current flow into the base through input terminal 7. This acts to change the NOR element N2 to provide a one output on output terminal 8, which one output switches NOR element N1 and there is then a zero on the output terminal 5 of NOR element N1. Since the input pulse is now removed from NOR element N3 before the flip-flop FF switches to remove the output at terminal 5, the NOR element N5 will continue to have a one value input at 33 from the NOR element N3 so that the output at Q will remain zero. However, were there to be an additional input pulse applied to terminal 1, it would take off the input to the NOR N5 at terminal 33 and a one value output pulse would appear at output terminal Q. This additional input pulse would not change the state of the flip-flop FF as it would only drive the NOR element N2 more into cutoff. Any succeeding input pulses would also be seen at output terminal Q in the same manner, unless there were an intervening input pulse applied at input terminal 2. A signal pulse received at input terminal 2 would operate in the same manner as described above with reference to an input pulse applied to terminal 1 in changing the state of the flip-flop FF and no output would be seen at P except for succeeding input signal pulses to input terminal 2. Therefore, it may be seen that when a pulse appears on input 1, and the next succeeding pulse also appears at 1, without an input pulse arriving at input 2 in the meantime, the logic operation of the differential rate circuit of FIG. 3 produces a one output signal from the NOR element N5 at the output terminal Q. Similarly, the arrival of two pulses at input 2, without an intermediate pulse on the input 1, will cause a one output signal from the NOR element N6 at output terminal P. It can therefore be seen that if pulses arrive alternately on lines 1 and 2, there is no output on the output lines Q and P. If, however, for example, three input pulses come on input line 1 and only one input pulse on input 2 then one of the pulses on input line 1 is canceled and there appears on the output line 1 two output pulses as the difference between the input signal pulses supplied to the two input lines.

Reference is here made to my related copending application Serial No. 789,610 entitled "Differential Rate Circuit" filed January 28, 1959, now Patent No. 2,985,773, the invention therein described performed a function similar to that of the circuit shown in FIG. 3 of the present invention.

It may be desirable that a well known and conventional coincident pulse canceller device be operative to prevent pulses that are substantially coincident from being applied to the input lines of the present differential frequency rate circuit. One suitable form of such a canceller device may be found in copending patent application Serial No. 824,392 filed July 1, 1959, by the same inventor.

While one best embodiment of the invention has been illustrated and described in detail, it is to be particularly understood that the invention is not limited thereto or thereby.

I claim as my invention:

1. A differential frequency rate circuit comprising first and second input lines, a bistable signal device having first and second input means and first and second output means and being capable of supplying an output signal of a first polarity, first and second signal providing means for applying only signals of a polarity opposite to that of said output means, said first and second signal providing means being respectively connected between said first and second input lines and said second and first input means of the bistable signal device, first and second coupling circuit means operative respectively to produce an output signal when there is no input signal supplied to said coupling circuit means, first and second gate circuits each having at least two inputs and operative to produce an output signal only when there is no input signal applied thereto, said first and second coupling circuit means being respectively connected between said first and second input lines and the inputs of said first and second gate circuits with the latter inputs of said first and second gate circuits also being respectively connected to said first and second output means of the bistable signal device.

2. A differential frequency rate circuit comprising first and second input lines, a bistable signal device having first and second input means and first and second output means capable of supplying an output signal of a first polarity, first and second diode devices being operative respectively to ground from the first and second input means of the bistable signal device for applying signals of the same polarity as said output means of the bistable signal device, first and second time relay means being respectively connected between said first and second input lines and said second and first input means of the bistable signal device, first and second coupling circuit means operative to produce an output signal when there is no input signal supplied to said coupling circuit means and vice versa, first and second gate circuits each having at least two inputs and operative to produce an output signal only when there is no input signal supplied to that gate circuit means, said first and second coupling circuit being respectively connected between said first and second input lines and inputs of said first and second gate circuits, said inputs of the first and second gate circuits also being respectively connected to said first and second output means of the bistable signal device.

3. A differential frequency rate circuit comprising first and second input lines, a bistable signal device having first and second input means and first and second output means capable of supplying an output of a first polarity, first and second means for applying only signals of a polarity opposite to said output of the bistable signal device output means, said first and second means being respectively connected between said first and second input lines and said second and first input means of the bistable signal device, first and second NOR coupling circuit means, first and second NOR gate circuits, said first and second NOR coupling circuit means being respectively connected between said first and second input lines and the inputs of said first and second NOR gate circuits, said inputs of the first and second NOR gate circuits also being respectively connected to said first and second output means of the bistable signal device.

4. A differential frequency rate circuit comprising first and second input lines, a flip flop element having first and second input means and first and second output means capable of supplying an output of a first polarity, first and second means for applying only signals of a polarity opposite to said output of the flip flop element output means, said first and second means being respectively connected between said first and second input lines and said second and first input means of the flip flop element, first and second coupling circuit means operative to produce an output signal when there is no input signal supplied to said coupling circuit and vice versa, first and second NOR gate circuits each having two inputs and operative to produce an output signal only when there is no input signal supplied to said NOR gate circuit, said first and second coupling circuit means being respectively connected between said first and second input lines and the inputs of said first and second NOR gate circuits, said inputs of the first and second NOR gate circuits also being respectively connected to said first and second output means of the flip flop element.

References Cited in the file of this patent

UNITED STATES PATENTS 2,795,695 Raynsford ------------- June 11, 1957